United States Patent
Jain et al.

(10) Patent No.: US 8,243,895 B2
(45) Date of Patent: Aug. 14, 2012

(54) COMMUNICATION SYSTEM WITH CONFIGURABLE SHARED LINE PRIVACY FEATURE

(75) Inventors: Mukul Jain, San Jose, CA (US); Vinod Katkam, San Jose, CA (US)

(73) Assignee: Cisco Technology, Inc., Islandia, NY (US)

( * ) Notice: Subject to any disclaimer, the term of this patent is extended or adjusted under 35 U.S.C. 154(b) by 1131 days.

(21) Appl. No.: 11/300,190

(22) Filed: Dec. 13, 2005

(65) Prior Publication Data

US 2007/0133776 A1     Jun. 14, 2007

(51) Int. Cl.
*H04M 13/00* (2006.01)
(52) U.S. Cl. ......................... 379/177; 379/198
(58) Field of Classification Search ........... 379/210.01–215.01, 156, 164, 379/165, 198, 200, 229–231, 373.01–373.02, 379/167.01–187
See application file for complete search history.

(56) References Cited

U.S. PATENT DOCUMENTS

| | | | | |
|---|---|---|---|---|
| 4,825,465 A | * | 4/1989 | Ryan | 379/399.01 |
| 5,008,884 A | * | 4/1991 | Yazawa et al. | 370/384 |
| 5,200,994 A | * | 4/1993 | Sasano et al. | 379/142.06 |
| 5,206,905 A | | 4/1993 | Lee et al. | |
| 5,220,599 A | * | 6/1993 | Sasano et al. | 379/142.06 |
| 5,341,413 A | | 8/1994 | Hori et al. | |
| 5,349,642 A | | 9/1994 | Kingdom | |
| 5,402,490 A | | 3/1995 | Mihm, Jr. | |
| 5,521,969 A | * | 5/1996 | Paulus et al. | 379/142.02 |
| 5,568,540 A | | 10/1996 | Greco et al. | |
| 5,608,786 A | | 3/1997 | Gordon | |
| 5,615,213 A | | 3/1997 | Griefer | |
| 5,623,537 A | * | 4/1997 | Ensor et al. | 379/88.2 |
| 5,754,630 A | * | 5/1998 | Srinivasan | 379/88.23 |
| 5,794,218 A | | 8/1998 | Jennings et al. | |
| 5,878,124 A | | 3/1999 | Griesmer et al. | |

(Continued)

FOREIGN PATENT DOCUMENTS

EP     1536645     6/2005

(Continued)

OTHER PUBLICATIONS

How to Build Smart Appliances, Albercht Schmidt, Kristof Van Laerhoven, IEEE Personal Communications, Aug. 2001, pp. 66-71.

(Continued)

*Primary Examiner* — Fan Tsang
*Assistant Examiner* — Assad Mohammed
(74) *Attorney, Agent, or Firm* — Baker Botts L.L.P.

(57) ABSTRACT

A PBX system with a shared line connected to a plurality of telephone devices includes one or more processors that control a connection for an incoming call from a caller, the one or more processors being operable to access a listing that includes one or more callers or calling numbers designated as private to a first telephone device. The one or more processors being further operable to send an alert to only the first telephone device in the event that the one or more callers or the calling numbers in the listing includes a caller or calling number associated with the incoming call. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

8 Claims, 5 Drawing Sheets

U.S. PATENT DOCUMENTS

| | | | |
|---|---|---|---|
| 5,905,448 A | 5/1999 | Briancon et al. | |
| 5,912,674 A | 6/1999 | Magarshak et al. | |
| 5,937,040 A | 8/1999 | Wrede et al. | |
| 5,943,611 A | 8/1999 | Moelne | |
| 5,974,142 A | 10/1999 | Heer et al. | |
| 5,978,450 A * | 11/1999 | McAllister et al. | 379/88.02 |
| 599,959 A | 12/1999 | Shaffer et al. | |
| 6,044,081 A | 3/2000 | Bell et al. | |
| 6,122,347 A * | 9/2000 | Borland | 379/70 |
| 6,167,043 A * | 12/2000 | Frantz | 370/356 |
| 6,259,405 B1 | 7/2001 | Stewart et al. | |
| 6,271,764 B1 | 8/2001 | Okamura | |
| 6,285,750 B1 * | 9/2001 | Brachman et al. | 379/211.02 |
| 6,298,324 B1 | 10/2001 | Zuberec et al. | |
| 6,324,271 B1 | 11/2001 | Sawyer et al. | |
| 6,366,651 B1 | 4/2002 | Griffith et al. | |
| 6,373,817 B1 | 4/2002 | Kung et al. | |
| 6,421,544 B1 | 7/2002 | Sawada | |
| 6,434,394 B1 * | 8/2002 | Grundvig et al. | 455/463 |
| 6,438,600 B1 | 8/2002 | Greenfield et al. | |
| 652,629 A1 | 2/2003 | Matsuo | |
| 6,522,726 B1 | 2/2003 | Hunt et al. | |
| 6,542,583 B1 | 4/2003 | Taylor | |
| 6,542,586 B1 | 4/2003 | Helstab | |
| 6,545,596 B1 | 4/2003 | Moon | |
| 6,564,261 B1 | 5/2003 | Gudjonsson et al. | |
| 6,567,508 B2 * | 5/2003 | Katayama | 379/93.23 |
| 6,587,553 B1 * | 7/2003 | Shaffer et al. | 379/188 |
| 6,587,680 B1 | 7/2003 | Ala-Laurila | |
| 6,643,774 B1 | 11/2003 | McGarvey | |
| 6,647,107 B1 * | 11/2003 | Horrer | 379/214.01 |
| 6,654,455 B1 | 11/2003 | Isaka | |
| 6,665,534 B1 * | 12/2003 | Conklin et al. | 455/417 |
| 6,721,401 B2 | 4/2004 | Lee et al. | |
| 6,738,461 B2 * | 5/2004 | Trandal et al. | 379/142.02 |
| 6,766,007 B1 | 7/2004 | Dermler et al. | |
| 6,769,000 B1 | 7/2004 | Akhtar et al. | |
| 6,771,639 B1 | 8/2004 | Holden | |
| 679,229 A1 | 9/2004 | Cannon et al. | |
| 6,792,296 B1 | 9/2004 | Van Bosch | |
| 6,798,874 B1 | 9/2004 | Ohlinger et al. | |
| 6,799,052 B2 | 9/2004 | Agness et al. | |
| 6,804,334 B1 | 10/2004 | Beasley et al. | |
| 6,816,469 B1 | 11/2004 | Kung et al. | |
| 6,826,173 B1 * | 11/2004 | Kung et al. | 370/352 |
| 6,839,761 B2 | 1/2005 | Kadyk et al. | |
| 6,847,715 B1 | 1/2005 | Swartz | |
| 6,870,835 B1 * | 3/2005 | Chen et al. | 370/354 |
| 6,876,734 B1 | 4/2005 | Summers et al. | |
| 6,898,279 B1 | 5/2005 | Baker et al. | |
| 6,905,414 B2 | 6/2005 | Danieli et al. | |
| 6,907,123 B1 | 6/2005 | Schier | |
| 6,912,275 B1 | 6/2005 | Kaplan | |
| 6,917,672 B2 | 7/2005 | Brown et al. | |
| 6,918,034 B1 | 7/2005 | Sengodan et al. | |
| 6,928,558 B1 | 8/2005 | Allahwerdi et al. | |
| 6,931,001 B2 | 8/2005 | Deng | |
| 6,934,858 B2 | 8/2005 | Woodhill | |
| 6,947,417 B2 | 9/2005 | Laursen et al. | |
| 6,959,184 B1 | 10/2005 | Byers et al. | |
| 6,977,993 B2 | 12/2005 | Starbuck et al. | |
| 6,985,745 B2 | 1/2006 | Quaid | |
| 6,987,744 B2 | 1/2006 | Harrington et al. | |
| 7,031,449 B1 | 4/2006 | Lundy et al. | |
| 7,042,989 B2 | 5/2006 | Lawson | |
| 7,085,244 B2 | 8/2006 | Koskelainen et al. | |
| 7,120,135 B2 * | 10/2006 | Kim | 370/329 |
| 7,139,370 B1 | 11/2006 | Tse | |
| 7,162,020 B1 * | 1/2007 | Forte | 379/201.01 |
| 7,189,132 B2 | 3/2007 | Nacik et al. | |
| 7,275,109 B1 | 9/2007 | Lee | |
| 7,333,614 B2 | 2/2008 | Jarosinski et al. | |
| 7,379,471 B2 * | 5/2008 | Mitsumori et al. | 370/426 |
| 7,463,730 B2 * | 12/2008 | Katkam et al. | 379/266.1 |
| 7,466,801 B2 | 12/2008 | Miller et al. | |
| 7,529,552 B2 | 5/2009 | Cighir et al. | |
| 7,561,892 B2 | 7/2009 | Huh et al. | |
| 7,694,138 B2 | 4/2010 | O'Gorman et al. | |
| 2002/0010008 A1 | 1/2002 | Bork et al. | |
| 2002/0040936 A1 | 4/2002 | Wentker et al. | |
| 2002/0068537 A1 | 6/2002 | Shim et al. | |
| 2002/0077102 A1 * | 6/2002 | Achuthan et al. | 455/435 |
| 2002/0086680 A1 | 7/2002 | Hunsinger | |
| 2002/0098831 A1 | 7/2002 | Castell et al. | |
| 2002/0132638 A1 | 9/2002 | Plahte et al. | |
| 2002/0140745 A1 | 10/2002 | Allenby et al. | |
| 2002/0167937 A1 | 11/2002 | Goodman | |
| 2002/0178228 A1 | 11/2002 | Goldberg | |
| 2002/0181691 A1 | 12/2002 | Miller et al. | |
| 2002/0188755 A1 * | 12/2002 | Yeom | 709/238 |
| 2002/0198004 A1 | 12/2002 | Heie et al. | |
| 2003/0043992 A1 | 3/2003 | Wengrovitz | |
| 2003/0061496 A1 | 3/2003 | Ananda | |
| 2004/0003070 A1 | 1/2004 | Fernald et al. | |
| 2004/0066932 A1 | 4/2004 | Seligmann | |
| 2004/0078334 A1 | 4/2004 | Malcolm et al. | |
| 2004/0078349 A1 | 4/2004 | Syrjala et al. | |
| 2004/0121774 A1 | 6/2004 | Rajkotia et al. | |
| 2004/0128350 A1 | 7/2004 | Topfl et al. | |
| 2004/0131206 A1 | 7/2004 | Cao et al. | |
| 2004/0205330 A1 | 10/2004 | Godfrey et al. | |
| 2004/0248586 A1 | 12/2004 | Patel et al. | |
| 2005/0022020 A1 | 1/2005 | Fremberg | |
| 2005/0031110 A1 | 2/2005 | Haimovich et al. | |
| 2005/0053219 A1 | 3/2005 | Pearson | |
| 2005/0069113 A1 | 3/2005 | Suh | |
| 2005/0157708 A1 | 7/2005 | Chun | |
| 2005/0177622 A1 | 8/2005 | Spielman et al. | |
| 2005/0197110 A1 | 9/2005 | Hasan et al. | |
| 2005/0212749 A1 | 9/2005 | Marvit | |
| 2005/0239486 A1 | 10/2005 | D'Avello | |
| 2005/0272413 A1 | 12/2005 | Bourne | |
| 2005/0273333 A1 | 12/2005 | Morin et al. | |
| 2006/0009238 A1 | 1/2006 | Stanco | |
| 2006/0034336 A1 | 2/2006 | Huh et al. | |
| 2006/0035657 A1 | 2/2006 | Lim | |
| 2006/0036857 A1 | 2/2006 | Hwang | |
| 2006/0045252 A1 | 3/2006 | Gorti | |
| 2006/0068731 A1 | 3/2006 | Seier | |
| 2006/0079280 A1 | 4/2006 | LaPerch | |
| 2006/0084414 A1 | 4/2006 | Alberth | |
| 2006/0104218 A1 | 5/2006 | Kako | |
| 2006/0105790 A1 | 5/2006 | Jin et al. | |
| 2006/0116175 A1 | 6/2006 | Chu | |
| 2006/0126529 A1 | 6/2006 | Hardy | |
| 2006/0147002 A1 | 7/2006 | Desai et al. | |
| 2006/0206454 A1 | 9/2006 | Forstall et al. | |
| 2006/0221942 A1 | 10/2006 | Fruth et al. | |
| 2006/0239277 A1 * | 10/2006 | Gallagher | 370/401 |
| 2007/0005963 A1 | 1/2007 | Eldar et al. | |
| 2007/0036322 A1 * | 2/2007 | Goldman et al. | 379/211.02 |
| 2007/0037610 A1 | 2/2007 | Logan | |
| 2007/0064908 A1 * | 3/2007 | Levy et al. | 379/211.03 |
| 2007/0112571 A1 | 5/2007 | Thirugnana | |
| 2008/0146216 A1 | 6/2008 | Newman et al. | |

FOREIGN PATENT DOCUMENTS

| | | |
|---|---|---|
| EP | 1817848 | 10/2005 |
| EP | 1731995 | 12/2006 |
| GB | 2347593 | 9/2000 |
| GB | 2 406 464 | 3/2005 |
| WO | WO 2005/104520 | 11/2005 |
| WO | WO 2006/028514 | 3/2006 |
| WO | WO 2006/071420 | 7/2006 |

OTHER PUBLICATIONS

Schulzrinne H et al: "Signaling for Internet telephony" Network Protocols, 1998. Proceedings. Sixth.

* cited by examiner

COMMUNICATION SYSTEM WITH CONFIGURABLE SHARED LINE PRIVACY FEATURE

FIELD OF THE INVENTION

The present invention relates generally to the fields of data networks and communication systems; more specifically, to a communication networks that support shared lines.

BACKGROUND OF THE INVENTION

Small businesses, home offices, and enterprises interested in reducing overhead costs use shared telephone lines. Many business enterprises use shared communication (e.g., telephone) lines in their private branch exchange (PBX) system to allow more than one person to answer a call and to achieve cost savings. In a shared telephone line system, an incoming call to a single telephone number or extension is directed to a plurality of telephone devices, with each device usually being associated with a different person or work environment. In many cases, a receptionist or Interactive Voice Response (IVR) unit answers the calls and then directs each call to an extension or line that is shared by multiple persons. For example, a manager may share a line with his assistant or secretary such that an incoming call to the number or extension rings on both of their telephones. In other cases, a user may apply a shared line to multiple phones intended to reach that individual, such as where an incoming call simultaneously rings to a person's desk phone and their laboratory phone.

Numerous systems and methods exist for handling telephone calls in a shared line environment. For example, U.S. Pat. No. 6,870,835 teaches a method of handling incoming calls directed to a virtual communication subscriber who is connected to a communication network via a shared line system. U.S. Pat. No. 5,432,844 teaches an automated telephone line sharing and lockout apparatus that allows only one telephone set or other communication apparatus to be connected to a shared line. A shared telephone line answering system in which extension telephone answering devices can be temporarily disarmed so they do not respond to tone codes that might otherwise activate them is disclosed in U.S. Pat. No. 4,805,210.

A number of commercial communication system products are available that combine call processing and IP telephony with many of the functions of a conventional IP-PBX system for business enterprises. For instance, Cisco's CallManager™ is a software-based call processing component that extends enterprise telephony features and functions to packet telephony network devices such as IP phones, media processing devices, voice-over-IP (VoIP) gateways, and multimedia applications. Additional data, voice, and video services such as unified messaging, multimedia conferencing, collaborative contact centers, and interactive multimedia response systems may interact with the IP telephony solution through the CallManager™ open telephony application programming interface (API).

In an existing version of the CallManager™ call processing software, when an incoming call is received at a telephone device (e.g., IP phone) the user can make the call private by pressing a "Privacy" softkey or button on their telephone device. When the Privacy button is pressed (i.e., in an "on" state) call information such as the calling number, the name of caller, etc., that is normally displayed is suppressed for all of the devices on the shared line other than the device answering the call. That is, call information is no longer displayed on the other telephone devices connected to the shared line. Instead, after the call has been answered and the Privacy button pressed, the other devices on the shared line typically display the words "In Use" or "Private". In addition, pressing the Privacy button prevents others from listening to the call by cutting off the media stream to all of the other devices on the shared line.

One problem with the Privacy button feature on existing call processing systems is that privacy is provided only after the call has been answered. This means that while the call is ringing, the call information is revealed on all of the devices connected to the shared line. In other words, until the time that the call is answered, persons who may be viewing any telephone device on the shared line can see the call information. Even after the call has been answered, until the Privacy button is pressed others may join in the call simply by picking up one of the shared line telephone devices.

What is needed therefore is a call processing system that overcomes the drawbacks of the prior art and which provides enhanced call privacy for both the caller and the called party in a shared line communication system

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A system and method that enhances a PBX system with enriched shared line and privacy features is described. In the following description specific details are set forth, such as device types, system configurations, methods, etc., in order to provide a thorough understanding of the present invention. However, persons having ordinary skill in the relevant arts will appreciate that these specific details may not be needed to practice the present invention.

According to one embodiment of the present invention, a privacy mechanism is provided that allows a shared communication line user to dynamically configure a list of contacts (i.e., callers or calling numbers) and mark or designate them as private. Each shared line of the PBX system is proactively configured in this manner such that when a call arrives from a caller or number that is listed as private for a certain user, the call rings at the telephone device associated with the intended recipient and not at any of the other telephone devices on the shared line. Moreover, call information of the incoming private call is not displayed on the other telephone devices connected to the shared line. In other words, if a contact is marked private and tied to a particular shared line, then incoming calls received from the contact will only alert (e.g., ring and display call information) the shared line telephone device associated with a user who has listed the contact as private under his personal configuration settings.

By way of example, in a manager-secretary scenario where both share the same telephone line, the manager may want to maintain privacy from the manager for certain calls from certain contact individuals. The same could be true for the secretary, who might desire to keep calls from her friends, spouse, relatives, etc., private and personal so as to avoid disturbing the manager. In accordance with one embodiment of the present invention, the manager and secretary can each configure their own personal privacy policies or preferences such that the PBX system only alerts one person's telephone when an incoming call arrives from a person or number in included in that person's privacy list.

Figure 1:
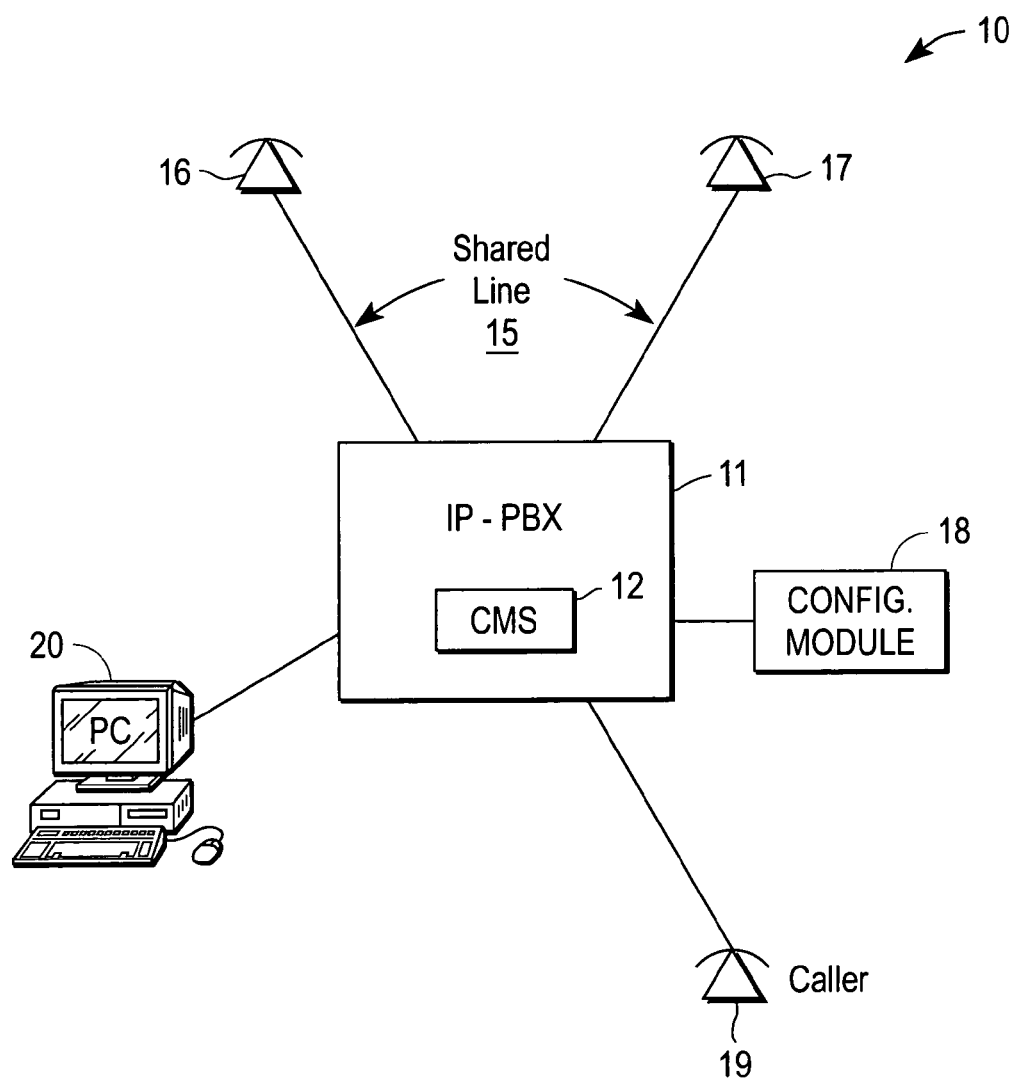
FIG. 1 is a conceptual diagram of an IP-PBX system in accordance with one embodiment of the present invention.

FIG. 1 illustrates a call processing system 10 in accordance with one embodiment of the present invention that includes an IP-PBX 11 that runs call management software (CMS) or firmware program 12 for implementing call routing, processing and IP telephony functions. Other embodiments may utilize a standard PBX system that handles calls sent over a conventional public switched telephone network (PSTN). Coupled with IP-PBX 11 is a configuration module 18 that includes a memory to store the privacy policies or configuration listings associated with telephone devices 16 and 17 connected to a shared line 15. Configuration module 18 may be implemented in software, hardware (e.g., RAM), or firmware components, and, in certain embodiments, may be incorporated into IP-PBX 11, or be integrated into the user preferences or profile settings typically provided for in CMS 12. In this example, the configuration listings or personal settings may be input into configuration module 18 via a personal computer (PC) 20, shown coupled with IP-PBX 11. Alternatively, individuals may input lists of private calling numbers directly through a user interface (e.g., keypad) of their telephone devices 16 & 17.

In accordance with the example shown in FIG. 1, the configuration listing of each individual on the shared line consists of a set of calling numbers or names that are associated with a specific device connected to the shared line. When a call arrives from a number that is included in a person's list, it is treated as a private call for the specific device, such that no information is shared (including ringing or other alerts) with the other devices on the shared line.

Figure 2:
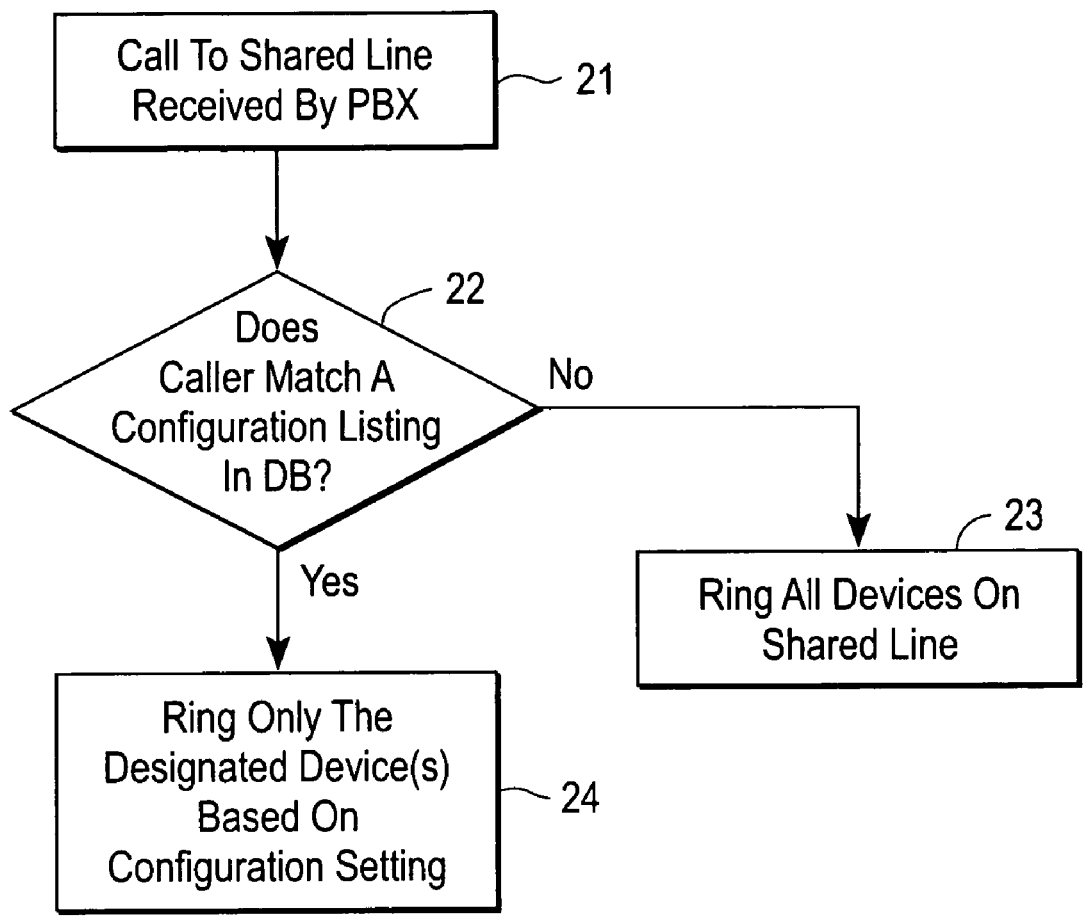
FIG. 2 is a flowchart diagram that illustrates a method of operation according to one embodiment of the present invention.

FIG. 2 is a flowchart diagram that illustrates a method of operation according to one embodiment of the present invention. In the example of FIG. 2, when an call to a shared line arrives at the PBX system (block 21), the configuration module is accessed to determine whether the caller (name or number) matches a privacy configuration listings stored in a memory or database associated with the configuration module (block 22). In the event that the caller is listed as private for a designated device on the shared line, then only that device is alerted to the call (e.g., ringing and display of call information). This is indicated in block 24 of FIG. 2, wherein the designated telephone device is alerted based on the configuration settings, and all other devices on the shared line are not alerted. In the case where the caller is not contained in any configuration listing, then all of the devices on the shared line are alerted of the call (block 23). In other words, the default configuration is inclusive of all devices on the shared line; however, module 18 may be proactively configured such that calls from specified callers or numbers are exclusive to a particular telephone device.

Practitioners will appreciate that the configuration module 18 of FIG. 1 may be programmed to preclude the possibility of multiple devices or persons on a shared line listing the same contact or caller in their privacy settings. For example, if a user associated with telephone device 17 attempts to list caller 19 as private in their personal configuration settings, and caller 19 is already listed as private in association with telephone device 16, the system may respond with an error message. Alternatively, the system may respond by reporting that caller 19 is already listed as being private with respect to another device on the shared line.

In another embodiment, certain configuration settings associated with a particular device on a shared line may allow for shared calls to be passed through to a subset of devices connected to the shared line. For example, a shared line may be connected with an arbitrary number (e.g., seven) of separate telephone devices, with a predefined configuration setting allowing a subset (e.g., three) of the devices to be alerted to a call from a particular caller.

Figure 3:
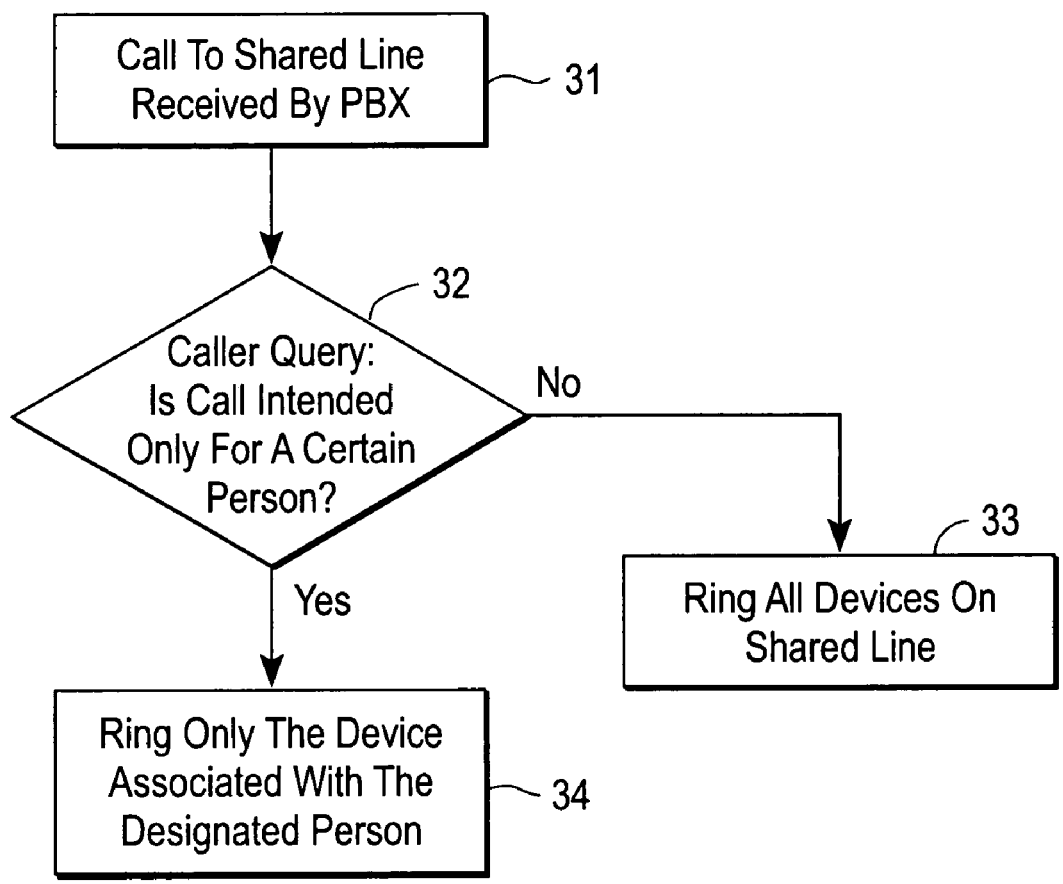
FIG. 3 is a flowchart diagram that illustrates a method of operation according to another embodiment of the present invention.

FIG. 3 is a flowchart diagram that illustrates a method of operation according to another embodiment of the present invention, wherein the caller may select which telephone device to ring on the shared line. Instead of the shared line users configuring the PBX system in accordance with their own privacy policies or preferences, in the embodiment of FIG. 3 the caller may is provided with the capability of controlling or asserting their own privacy policy on a per call basis. The example of FIG. 3 begins at block 31 with an incoming call to a shared line being received by the PBX system. After the call arrives and before any telephone device connected to the shared line is alerted, the PBX system sends a query back to the caller asking the caller whether they want to make the call private for a certain individual or device on the shared line (block 32).

Figure 4:
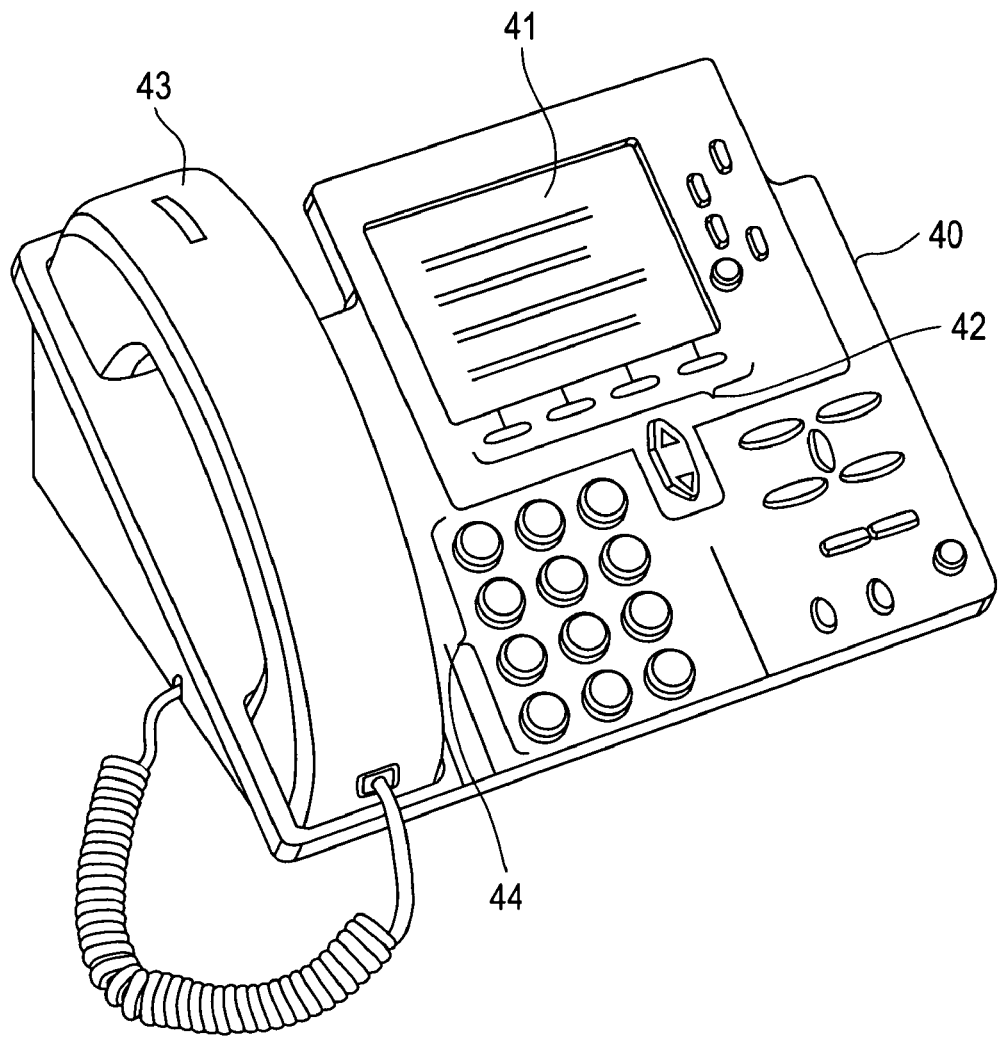
FIG. 4 is an IP telephone device with softkey functions utilized in accordance with one embodiment of the present invention.
Figure 5:
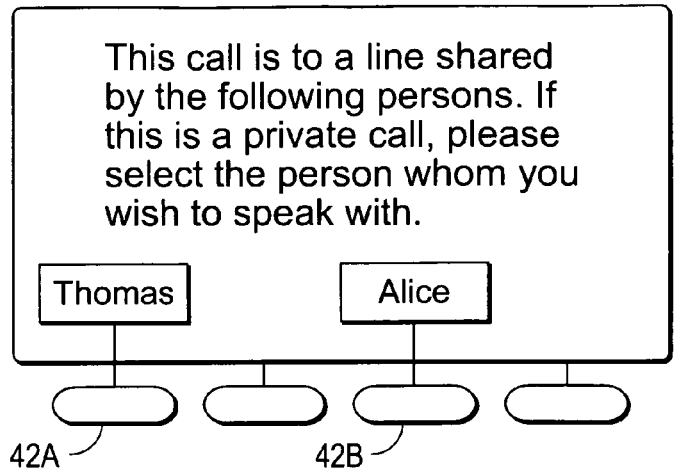
FIG. 5 illustrates an exemplary display screen of the IP telephone device shown in FIG. 4 according to one embodiment of the present invention.

By way of specific example shown in FIGS. 4 & 5, if Thomas and Alice share a telephone line, an incoming call to the shared line may result in a text message being displayed on a screen 41 of the caller's telephone device 40 notifying the caller that the call will alert both Thomas and Alice unless the caller elects to make the call private to one of the individuals. The notification and selection process may also be implemented via an IVR script audibly played on handset 43, wherein the caller may choose to make the call private to either Thomas or Alice by voice response, or by appropriate input response entered on keypad 44 or softkeys 42. In the case where the caller is presented with the privacy choice via a text message on the display screen of their telephone device, the caller may elect to make the call private for either Thomas or Alice by pressing one of the respective softkeys 42A or 42B (see FIG. 5).

Continuing with the exemplary flowchart of FIG. 3, in the event that the caller chooses to make the call private to a particular person or telephone device, only the device associated with the chosen or designated person is alerted (block 34). On the other hand, if the caller does not elect to make the call private, or if the caller fails to make a selection within a predetermined time period, the call rings to all of the telephone devices on the shared line (block 33).

In still another embodiment, caller control of the privacy policy may be included as a default or backup case in the event that no configuration listings or settings exist with respect to the caller or calling number. For instance, if a call arrives and the configuration module contains no listing of the caller or calling number, then the caller may be queried as described above before ringing any of the devices on the shared line. On the other hand, if the caller is included in a privacy listing of the configuration module, then caller control or assertion of privacy policies is overridden by the existing configuration policies of the shared line users. To state it differently, a query message is sent back to the caller only in the event that the caller or calling number does not match any listing contained in the configuration module of the PBX system.

Figure 6:
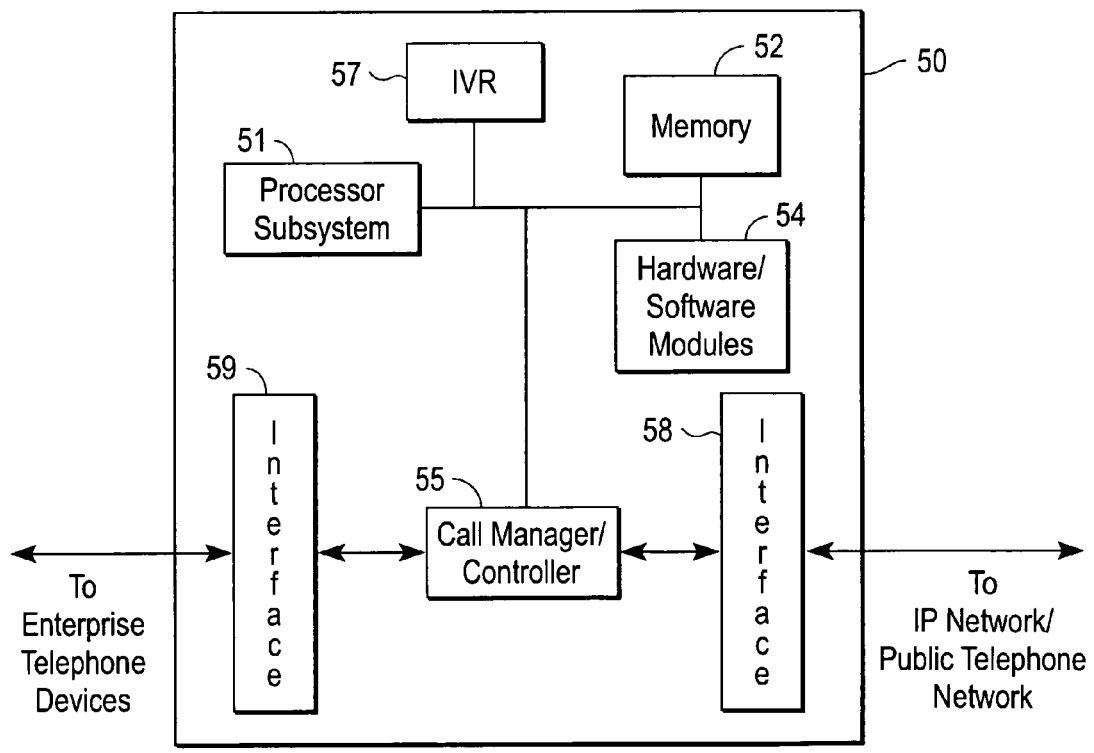
FIG. 6 is a circuit schematic block diagram of a PBX system according to one embodiment of the present invention.

FIG. 6 is a high-level circuit block diagram of an exemplary PBX system 50 according to one embodiment of the present invention. System 50 includes a processor subsystem 51 having one or more processors coupled to a memory 52 (e.g., RAM) that may comprise a database containing existing user preferences and/or privacy configuration settings, an IVR unit 57, hardware/software modules 54, and a call manager/controller unit 55 that functions to route calls between interfaces 58 & 59 having lines connected to an IP network/PSTN and telephone devices of the enterprise, respectively. Call router/controller unit 55 may also be utilized for communications with callers and the users of the enterprise telephone devices. An example of such communications is the play-out of IVR scripts to the caller during caller control or assertion of privacy policies.

In one implementation, IVR unit 57 may comprise a telephony script or a navigation menu module that may prompt a caller to choose one of a group of individuals sharing a telephone line associated with the called number. IVR unit 57 is typically embodied in one or more software or firmware modules with code that executes on one or more processors of subsystem 51. In other embodiments, IVR unit 57 may include dedicated processors that perform various tasks, such as speech processing, verification, and recognition. It is appreciated that PBX system 50 may also include a variety of other devices (e.g., controllers, EEPROMs, specialized processors, etc.) not shown in FIG. 6.

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. An Internet Protocol private branch exchange (IP-PBX) system for an enterprise comprising:
   a first interface to connect with an IP network;
   a second interface to physically connect with a shared line of the enterprise, the shared line being associated with a single telephone number or extension, the shared line being connected to a plurality of telephone devices, each of the telephone devices being associated with only a single user;
   one or more processors that control a connection between the IP network and one or more of the telephone devices on the shared line for an incoming call;
   a memory coupled to the one or more processors, the memory storing a listing of one or more callers or calling numbers designated as private to a user of a first telephone device of the plurality of telephone devices, the listing being configurable by the user;
   the one or more processors being operable to access the listing in the memory in response to the incoming call, and to send an alert to only the first telephone device in the event that the one or more callers or the calling numbers in the listing includes a caller or calling number associated with the incoming call, the one or more processors being further operable to cut off a media stream associated with the incoming call to all of the plurality of telephone devices on the shared line except the first telephone device.

2. The IP-PBX system of claim 1 wherein the alert comprises a periodic ring.

3. The IP-PBX system of claim 2 wherein the alert further comprises a text message display that includes a name or number of the caller.

4. The IP-PBX system of claim 1 wherein the one of more processors execute a program that controls routing of the incoming call from the IP network to the first telephone device.

5. The IP-PBX system of claim 1 wherein the incoming call comprises a voice over Internet protocol (VoIP) call.

6. A processor-implemented method of handling an incoming call from a caller to a shared line associated with a single telephone number or extension comprising:
   receiving, by an Internet Protocol Private Branch Exchange (IP-PBX), an incoming voice over IP (VoIP) call from a caller;
   accessing, by the IP-PBX, a listing stored in a memory, the listing including one or more callers or calling numbers designated as private to a user of a first telephone device of a plurality of telephone devices connected to the shared physical line, each of the telephone devices being associated with only a single user, the listing being configurable by the user;
   sending, by the IP-PBX, an alert only to the first telephone device in the event that the one or more callers or the calling numbers in the listing includes the caller; and
   establishing, by the IP-PBX, an exclusive a media path on the shared line between the caller and the first telephone device.

7. The processor-implemented method of claim 6 wherein sending the alert only to the first telephone device comprises ringing the first telephone device.

8. The processor-implemented method of claim 6 wherein sending the alert only to the first telephone device comprises displaying a text message that includes a name or number of the caller on a screen of the first telephone device.

* * * * *